Feb. 11, 1969  W. R. STONE  3,426,907
WATER SPRAY CLEANING OF MULTIPLE, SPACED WALL FILTER ELEMENTS
Filed April 13, 1967  Sheet 1 of 2

INVENTOR
WINTHROP R. STONE
BY Alfred P. Lowery
ATTORNEY

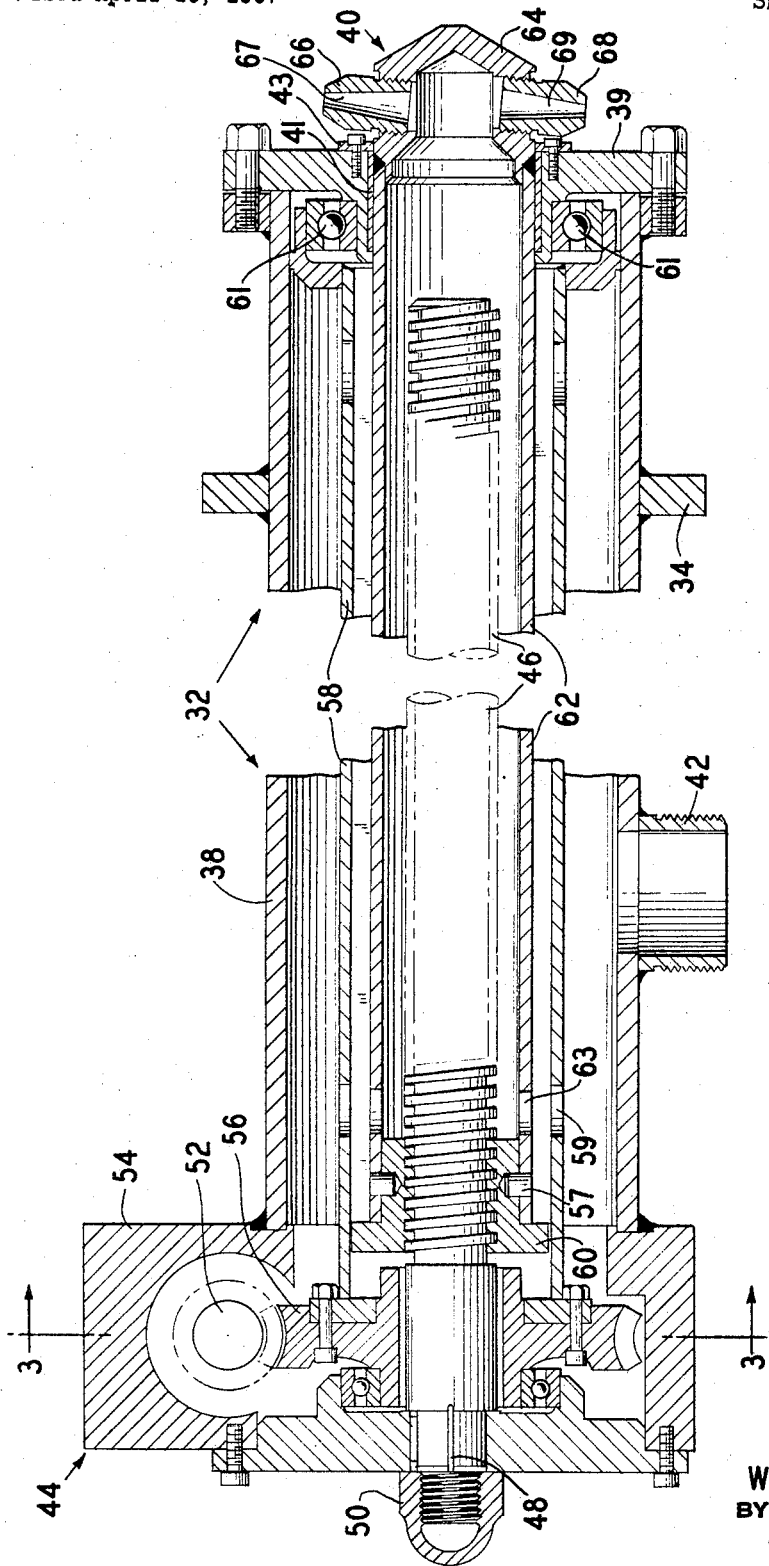

United States Patent Office 3,426,907
Patented Feb. 11, 1969

3,426,907
WATER SPRAY CLEANING OF MULTIPLE, SPACED WALL FILTER ELEMENTS
Winthrop R. Stone, Winfield, W. Va., assignor to Union Carbide Corporation, a corporation of New York
Filed Apr. 13, 1967, Ser. No. 630,647
U.S. Cl. 210—332      6 Claims
Int. Cl. B01d 23/24

ABSTRACT OF THE DISCLOSURE

An apparatus for washing the leaves of a pressure-leaf filter of the type wherein a plurality of juxtaposed filter leaves are mounted in a casing and the filtrate is removed from the filter casing via filtrate collecting means connected to the periphery of the filter leaves. The washing apparatus comprises a nozzle, supplied with high pressure water or other washing fluid, which is simultaneously rotated about its axis and advanced longitudinally of the filter casing through a passageway formed by centrally disposed openings in the filter leave and directs high velocity streams of washing fluid against each of the filter leaves in succession.

BACKGROUND OF THE INVENTION

Field of the invention

The invention pertains to filters of the class wherein a plurality of filter leaves are mounted within a casing, usually cylindrical in form, and the liquid to be filtered enters the casing and passes through a screen or cloth covering the faces of the filter leaves and thence to a discharge conduit to which the leaves are connected; the liquid to be filtered either being supplied under sufficient pressure to force it through the leaves or a vacuum being applied to the discharge conduit. Typically, the filter leaf is disc-shaped and comprises a coarse wire screen or spacer grid covered on each side by a fine screen or cloth upon which the filter cake is formed; the edges of the leaf being sealed except at the point of discharge, which, in the filters to which this invention is applicable, is located at the periphery of the leaf. The filtering action, with filters of this type, particularly when the object of the filtration is recovery of the filtrate rather than the filter cake, is ordinarily enhanced by the use of a fibrous or granular material known as a filter aid, e.g., powdered asbestos, kieselguhr, activated carbon, diatomaceous earth, and the like. The filter-aid may be used to form a precoat on the leaves in advance of the filtering operation or it may be fed continuously with the liquid being filtered to minimize the tendency toward clogging of the filter leaves. The filter cycle will then consist of the sequential steps of (1) precoating (where such procedure is utilized), (2) filtration, and (3) washing or cleaning. It is toward improvement of the washing or cleaning phase of the cycle, wherein the filter cake, consisting of the material being removed by filtration or a mixture of such material and filter aid, is stripped from the filter leaves, that this invention is directed.

Description of the prior art

Removal of the filter cake from the leaves of a pressure-leaf filter may be accomplished outside the filter casing by first removing the entire leaf pack, as shown in U.S. Patent 2,921,685, or it may be effected internally, to thereby avoid the costly and time-consuming operation of removing the leaves from the casing, by freeing the leaves of the filter cake while inside the casing, ordinarily by the action of fluid jets, and removing the cake from the bottom of the filter casing as a slurry. Heretofore, means for cleaning the filter leaves while they are within the filter casing has, for example, taken the form of a sluicing pipe extending longitudinally of the filter casing and having orifices or nozzles positioned between each pair of adjacent filter leaves whereby a spray of water or other cleaning fluid can be directed against the surfaces of the leaves; the sluicing pipe being positioned between the periphery of the leaves and the wall of the casing and being either fixed or adapted for reciprocal, rotary, or oscillatory motion, as typified by the constructions illustrated in United States Patents 1,237,838, 1,430,518, 1,432,134, 1,464,953, 1,489,037, 1,510,568, 2,703,177, 2,731,157 and 2,868,379. Alternatively, where the design of the filter leaves has been such as to provide for peripheral discharge of the filtrate rather than discharge at the center of the leaf, the washing system has taken the form of a similar sluicing pipe extending longitudinally of the filter casing through a passageway defined by central openings in each of the filter leaves and adapted to rotate about its axis, as typified by the constructions illustrated in United States Patents 2,878,942 and 2,936,075. Neither of these methods has been without its disadvantages, such as, for example, failure to wash the full face of each leaf, clogging of the nozzles by solid matter contained in the liquid being filtered, and inability to free the leaf from tenaciously adhering filter cake.

Summary of the invention

This invention comprises apparatus for freeing the leaves of a pressure-leaf filter of adhering filter cake, the essential element of which is a traversing nozzle, centrally and preferably axially disposed with reference to the filter casing, designed to direct streams of washing fluid against the filter leaves in such manner as to remove all, or substantially all, of the cake from the leaves. This apparatus finds application in pressure-leaf filters of the type wherein means are provided for discharge of the filtrate at the periphery rather than at the center of the leaves, so that the filtrate discharge means does not interfere with the functioning of the washing apparatus. In accordance with this invention, means are provided for rotating the nozzle about its axis and for simultaneously advancing the nozzle longitudinally of the filter casing through the passageway formed by the central openings in the filter leaves. Means to vary the speed of rotation and/or the speed of longitudinal travel and to automatically reverse the direction of travel at the appropriate point may also be included.

In contrast to the prior art use of a sluicing pipe having nozzles positioned between each pair of adjacent filter leaves, with resultant washing of each of the leaves at the same time, the apparatus of this invention effects washing of each of the leaves in succession as the nozzle traverses the filter casing longitudinally. This permits the washing fluid to be directed against each leaf at full force and, by virtue of the simultaneous rotational and translational motion of the nozzle, the stream of fluid is able to sweep the entire area of the face of each leaf. The disadvantages inherent in the prior art are overcome in that problems of clogging of the washing apparatus are avoided, because of the relatively large size of the fluid discharge openings in the nozzle and the great force with which the washing fluid may be directed through such openings, and particularly in that the high velocity stream of washing fluid shears the cake from the entire area of the face of the filter leaf, as well as from the interior wall of the filter casing, regardless of how tenaciously it may adhere.

BRIEF DESCRIPTION OF THE DRAWING

The drawings illustrate a preferred embodiment of the invention, with like reference characters designating corresponding parts in the several views.

FIGURE 2 is an enlarged side view in longitudinal section of the washing apparatus of this invention.

DESCRIPTION OF THE PREFERRED EMBODIMENTS

Figure 1:
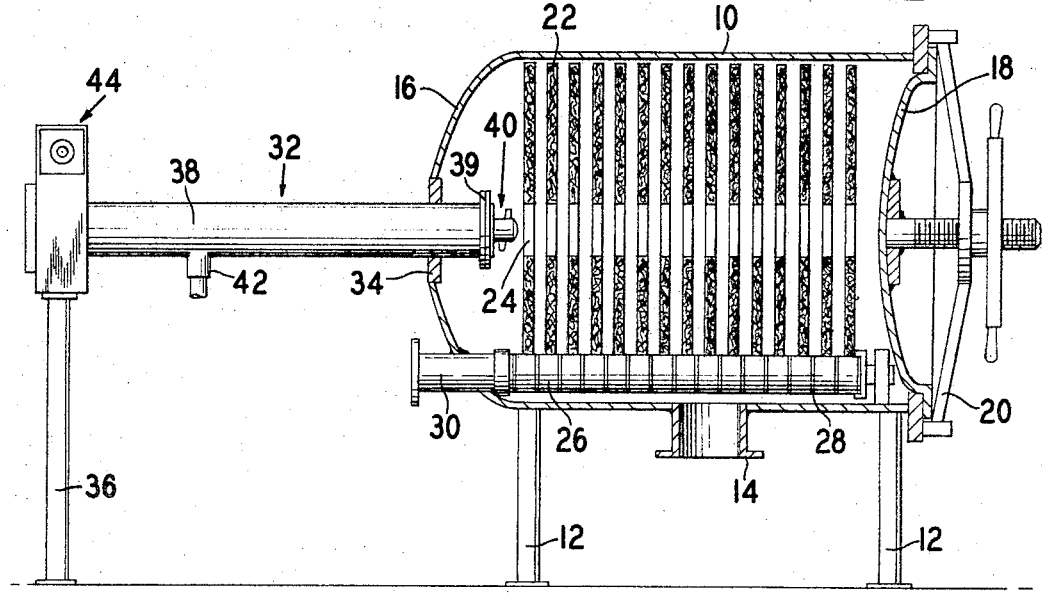
FIGURE 1 is a side view, partly in elevation and partly in longitudinal section, of a pressure-leaf filter having the washing apparatus of this invention incorporated therein.

Referring to FIG. 1, the numeral 10 designates a horizontally disposed cylindrical filter casing supported by legs 12 and having an inlet pipe 14 through which the liquid to be filtered is admitted under pressure to filter casing 10. One end of filter casing 10 is closed by dished head 16 and the opposite end by door 18 operated by quick-opening mechanism 20. Mounted within filter casing 10 and supported at the top by a guide rail (not shown) are a series of disc-like filter leaves 22 (there being fifteen leaves in all), having chordal upper and lower edges, each of which has a hole 24 located at its center and is connected at its lower end to a collector ring 26. Filter leaves 22 are made up of a coarse inner screen covered with fine screen on each side and are sealed off around the edge defining hole 24 and also around the entire peripheral edge except where they are connected to collector rings 26. Resilient gaskets 28 are disposed between adjacent collector rings 26 which are nested together to provide a tight fit and thereby form a filtrate discharge conduit connecting to outlet pipe 30. In operation, the liquid to be filtered enters filter casing 10 via inlet pipe 14 and passes through both faces of filter leaves 22 upon which the solids, or other filterable material, contained in the liquid gradually builds up as filter cake, with the clear filtrate entering collector rings 26 and passing out of the filter via outlet pipe 30. The filtration is continued until a layer of filter cake of desired thickness is built up on each of the leaves and then the leaves are stripped of filter cake and the cycle is started over. Where precoating is employed, this is usually accomplished by preparing a slurry of filter aid in a mixing tank and circulating this through the filter and back to the mixing tank until a layer of the desired thickness is built up on the filter leaves.

The construction of the filter casing, filter leaves, and collector rings forms no part of the present invention but rather is within the prior art. For details, reference is made to U.S. Patent 2,936,075 which contains a good description of a pressure-leaf filter to which the washing apparatus of this invention can be readily applied.

The washing apparatus, indicated generally in FIG. 1 by numeral 32, is supported near one end by mounting flange 34 welded into dished head 16 and near its opposite end by support leg 36 and comprises a drive mechanism, indicated generally by numeral 44, and housing tube 38 from which extends a nozzle, indicated generally by numeral 40, and to which is connected washing fluid inlet pipe 42. Necessary valves and piping for the filter and auxiliary equipment (not shown) are preferably arranged beneath washing apparatus 32 so that the combination of filter and washing apparatus will not require much more floor space than the filter itself even though the washing apparatus is of considerable length.

Figure 3:
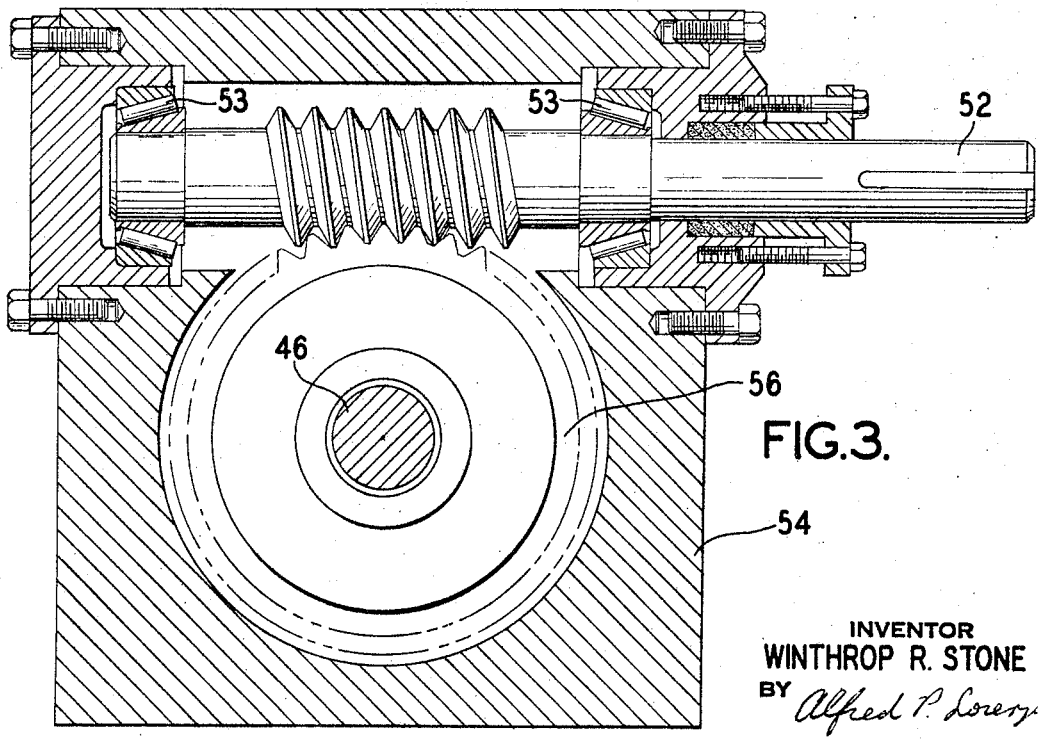
FIGURE 3 is a section taken on line 3—3 of FIGURE 2.

As shown in FIGS. 2 and 3, washing apparatus 32 comprises a fixed feed screw 46, of a length comparable to the length of the entire pack of filter leaves 22, held at one end by key 48 and nut 50. A worm shaft 52, which is supported by tapered roller bearings 53 and driven by a suitable motor and speed reducer (not shown) and which is enclosed in gear housing 54, drives worm gear 56 which is fixedly attached to one end of torque tube 58. Torque tube 58, supported at its opposite end by radial type ball bearings 61, in turn drives square shouldered torque nut 60 along fixed feed screw 46 either toward or away from gear housing 54 depending on the direction of rotation of worm shaft 52. A distribution tube 62 attached to torque nut 60 by pins 57 is thereby simultaneously rotated and advanced along fixed feed screw 46. Torque tube 58 has at least one opening 59 therein, whereby washing fluid may pass into the annular space surrounding distribution tube 62, which in turn contains at least one opening 63 whereby washing fluid may enter the annular space surrounding fixed feed screw 46.

Nozzle 40, which is welded to distribution tube 62 and rotates therewith, is slowly advanced as distribution tube 62 is fed along feed screw 46 and thereby longitudinally traverses filter casing 10 through the passageway defined by holes 24 in filter leaves 22. The forward travel of distribution tube 62 is controlled by preset micro switches in the control circuit (not shown) which stop its advance and reverse its travel and direction of rotation.

End flange 39 is bolted to the end of housing tube 38 and incorporates bronze sleeve bearing 41 within which distribution tube 62 is slideably and rotatably mounted. Retaining ring 43, affixed to end flange 39 by cap screws, serves to hold bronze sleeve bearing 41 in place. In addition to providing a suitable surface on which distribution tube 62 can slide and rotate, sleeve bearing 41 serves to support the overhung weight of distribution tube 62 as it advances and to eliminate radial movement thereof. By virtue of its close fit to distribution tube 62, sleeve bearing 41 also serves to minimize any loss of high pressure washing fluid.

Nozzle 40 comprises an integral body portion 64 which is threaded to receive spray tip 66, containing tapered bore 67, and spray tip 68, containing tapered bore 69; spray tips 66 and 68 being set at 180 degrees to each other and mounted, respectively, at plus five and minus five degrees to the perpendicular to the locus of horizontal travel of nozzle 40.

In operating the washing apparatus, at the start of the washing cycle nozzle 40 will be positioned toward the end of filter casing 10 enclosed by dished head 16 just in advance of the first of filter leaves 22 and washing fluid, e.g., high pressure water, will be admitted via washing fluid inlet pipe 42 (the filter having first been closed off at inlet pipe 14 and drained). The washing fluid will fill the annular spaces surrounding torque tube 58, distribution tube 62, and fixed feed screw 46 and will be emitted at high velocity from spray tips 66 and 68. Because of the angles at which spray tips 66 and 68 are mounted, there will be imparted to the stream of washing fluid emerging from tip 66 a forward directional component as well as a component perpendicular to the locus of the longitudinal travel of nozzle 40 and to the stream of washing fluid emerging from tip 68 a backward directional component as well as a component perpendicular to the locus of the longitudinal travel of nozzle 40. Thus, the stream emerging from tip 66 will be directed along a path defining an acute angle with the path of longitudinal travel of nozzle 40 and the stream emerging from tip 68 will be directed along a path defining an obtuse angle with the path of longitudinal travel of nozzle 40; the magnitude of these angles depending upon the position in which the spray tips are mounted and being 85 degrees and 95 degrees, respectively, where the spray tips are mounted at plus five and minus five degrees to the perpendicular to the locus of longitudinal travel of nozzle 40 as shown in the drawings.

As nozzle 40 approaches the first of filter leaves 22, the stream of washing fluid from spray tip 66 will impinge against the filter leaf first at its peripheral edge and then along a path moving gradually inward toward the edge of hole 24. Since nozzle 40 constantly rotates as it advances longitudinally, the stream of washing fluid from spray tip 66 will have swept the entire leftward facing surface of this filter leaf by the time nozzle 40 passes the leaf and its knife-like cutting action will have stripped this surface free of substantially all adhering filter cake. As nozzle 40 continues its advance toward the second of filter leaves 22, the stream of washing fluid from spray tip 66 will similarly impinge first against this leaf at its peripheral edge and will gradually sweep the entire leftward facing surface of the second leaf and strip it free of adhering filter cake. At the same time, the stream of washing fluid from spray tip 68 will sweep the rightward facing surface of the first filter leaf, impinging first at the edge of hole 24 and then moving gradually outward toward the periphery of the leaf. Thus, it is apparent that as nozzle 40 traverses the space between any two adjacent filter leaves the two opposing leaf surfaces will both be cleaned, one by the stream of washing fluid emerging from spray tip 66 and the other by the stream of washing fluid emerging from spray tip 68. By the time nozzle 40 has traversed the full length of the pack of filter leaves, i.e., when it reaches a position just in advance of door 18, it will have washed both sides of every filter leaf. The forward travel of nozzle 40 is then stopped, and upon being started again both its direction of travel and direction of rotation are reversed with the result that each of the filter leaves is again washed on both sides as nozzle 40 is retracted to its starting position adjacent dished head 16. One complete washing cycle, i.e., travel of nozzle 40 through the pack of filter leaves and then back to its starting position, accordingly results in each face of each leaf being washed once from its periphery to the opening at its center and once from the edge of this opening to its periphery.

It is to be noted that as a result of the simultaneous longitudinal and rotary motion of the nozzle the jet of washing fluid traverses the face of the filter leaf along a spiral path of either gradually diminishing radius or of gradually increasing radius depending upon whether the nozzle is approaching or receding from the surface involved. In this way, the jet is able to contact the full area of the filter leaf face and shear therefrom all adhering filter cake. Moreover, as the jet of washing fluid passes beyond the peripheral edge of the filter leaf it will effectively clean the adjacent casing wall of any adhering filter cake; an important advantage of the present invention as compared with certain of the devices of the prior art since this material would otherwise remain in the filter casing and interfere with precoating of the filter leaves in the next filtration cycle, e.g., it might be washed from the casing wall when precoating slurry is introduced and foul the leaves before they can be coated with filter aid.

The angles at which the streams of washing fluid emerging from the nozzle are directed are fixed by the design of the nozzle and will be selected in accordance with the geometry of the particular filter involved. It is apparent from the foregoing description that a suitable angle is dependent upon both the diameter of the filter leaves and the spacing between adjacent leaves, and is preferably such that as soon as the advancing nozzle passes one filter leaf the jet of washing fluid will impinge at the periphery of the leaf which is adjacent thereto in the direction of forward travel. In geometrical terms, for optimum results, the tangent of the acuate angle between the path of the forwardly directed stream of washing fluid and the path of longitudinal travel of the nozzle should be approximately equal to the ratio of the radius of the filter leaf to the distance between adjacent filter leaves. Thus, if the filter leaves are four feet in diameter and adjacent leaves are spaced three inches apart, then the tangent of the aforesaid angle would be 24/3 so that the angle would be about 83 degrees and the forwardly directed spray tip would be set at an angle of about plus seven degrees from the perpendicular to the locus of longitudinal travel of the nozzle.

As will be apparent from the foregoing description, considerable leeway in the angles at which the streams of washing fluid are directed is possible without loss of ability to effectively clean the filter leaves since the fluid streams emerge from the nozzle at high velocity and generate a great deal of spray and turbulence. It is also apparent that the essential characteristic of a nozzle for utilization in the washing apparatus of this invention is that it be adapted to direct at least two streams of washing fluid against the filter leaves, one stream along a path having a directional component in the direction of travel of the nozzle and the other stream along a path having a directional component in the direction opposite to the direction of travel of the nozzle. Only in this way can the traversing nozzle wash both sides of each leaf in the pack of juxtaposed filter leaves.

It should also be noted that both the speed of longitudinal travel and the speed of rotation of the nozzle in the apparatus described herein may be varied depending upon the requirements of the particular filtering operation, to thereby obtain optimum performance. With a filter removing oil from steam condensate and using diatomaceous earth as filter aid and water at 600 p.s.i.g. as washing fluid, good results have been obtained with the nozzle traversing, in one direction, the 50-inch length of the filter leaf pack in a period of 21 minutes and rotating at a rate of 9.3 revolutions per minute.

It is preferred, but not essential, that the passage-way for the traversing nozzle be defined by openings at the exact center of the filter leaves and the nozzle be axially disposed with reference to the filter leaves since in this way the streams of washing fluid most effectively contact the entire area of the leaf surface as the nozzle rotates. However, the openings in the filter leaves may be located off-center if desired, for example, where other design considerations dictate such location, but the effectiveness of the washing apparatus and its ability to utilize all of the washing fluid supplied in cleaning the leaves will obviously be diminished as the location of the openings is extended further from the center toward the periphery of the leaf. The openings in the filter leaves must be at least of sufficient size to permit the passage of the nozzle with adequate clearance and will ordinarily not be made larger than this minimum since this would result in undesirable loss in filtering area. Good results have been obtained with a filter leaf having a diameter of 4 feet, a central opening with a diameter of six inches, and a nozzle with a maximum diameter of 3.5 inches.

Pressure-leaf filters to which the washing apparatus of this invention can be adapted may be horizontally disposed or they may be mounted in a sloping or a vertical position. They may be operated by introducing the liquid under pressure or by applying vacuum to the filtrate discharge conduit. They may be cylindrical in form or of other configuration and may employ filter leaves which are generally circular in shape, as illustrated herein, or square, or of other construction. The filter leaves may comprise a single set or there may be two or more sets of filter leaves interleaved with one another and provided with separate filtrate discharge conduits as described in U.S. Patent 2,878,942. The washing apparatus may be readily adapted for use with a filter of any practical length; from a very short filter having, for example, 6 filter leaves, to a very long one, having, for example, 50 filter leaves.

Moreover, many minor variations and modifications of the washing apparatus are possible within the spirit and scope of this invention. Thus, the means for simultaneously rotating and longitudinally advancing the nozzle need not be a fixed feed screw, rotating worm gear, and torque tube as shown but may be any other mechanism for accomplishing such motion known to the art, for example, a fixed nut with female threads encompassing a traversing male thread bar having a distribution tube and nozzle attached to one end and a male splined section attached to the other end engaging a rotatably driven sprocket containing a female splined hub.

Since both faces of each filter leaf are washed while the nozzle makes a single longitudinal traverse of the pack of filter leaves, it is not essential that the leaves be given a second washing as the nozzle is reversed and returned to its starting position. Accordingly, the filter could be operated so that the washing step of one complete filtering cycle is effected by a single traverse of the nozzle and the nozzle is retained at its most extended position during the next filtering step and then effects the washing step of the next cycle on its return. Alternately, the control circuit could be designed to stop the nozzle at the end of one traverse and then bring it back to its starting position quickly without rotation, i.e., a fast retract operation.

A suitable means for stopping the nozzle and automatically reversing its direction of rotation and direction of longitudinal travel comprises a pair of micro switches actuated by circular rotating cams driven via a suitable speed reducer by the worm shaft of the washing apparatus and a relay, also actuated by the cams, which reverses the direction of rotation of the drive motor. Various alternate means suitable for this purpose will readily occur to those skilled in the art.

Many variations are also possible in the design of a nozzle suitable for use in this invention. Thus, for example, the nozzle need not have spray tips of the type illustrated herein to control the streams of washing fluid but could utilize recessed passageways within the body of the nozzle. The nozzle could also be constructed to provide more than two streams of washing fluid to impinge against the filter leaves, if desired. Regardless of the particular design utilized it would, of course, be desirable to more or less balance the forces which are generated by having the respective fluid streams directed at an angle of about 180 degrees to each other.

It is intended to include within the claims appended hereto any nozzle, whether constructed in accordance with the specific embodiment illustrated herein or featuring any of the numerous possible variations thereof that would be apparent to the skilled artisan, which will direct at least two streams of washing fluid, one along a path having a directional component in the direction of travel of the nozzle and another along a path having a directional component in the direction opposite to the direction of travel of the nozzle in such manner as to wash substantially the entire area of the opposing faces of adjacent filter leaves as it traverses the space therebetween.

In the specific embodiment of the invention illustrated herein, the nozzle remains within the filter casing and in contact with the liquid being filtered during the precoating and filtering steps of the cycle. This is ordinarily entirely adequate and no problem of clogging of the nozzle occurs. In contrast to the devices of the prior art utilizing a sluicing pipe with a plurality of orifices or nozzles each having relatively small openings therein and thereby tending to become clogged, the washing apparatus of this invention utilizes a nozzle with relatively larger passageways and since the pressure of the washing fluids is not dissipated by requiring flow from a series of openings extending over a long distance, as with the sluicing pipes of the prior art, the washing fluid will emerge from the nozzle at great velocity and will ordinarily readily clear the passageways of any material that may have become lodged therein. However, since the washing apparatus of this invention may be utilized with pressure-leaf filters employed in a wide variety of filtering tasks, e.g., removal of oil from steam condensate, purification of beverages or other food products, removal of solid particles from oil, etc., and since in some instances fibrous materials which tend to seriously clog the nozzle may be present in suspension, it may be desirable to protect the nozzle so that it is not in contact with the liquid being filtered during the filtering operation. While this is a difficult problem where the washing apparatus consists of a sluicing pipe as was used in the prior art, it is a simple matter to so protect the nozzle utilized in the washing apparatus of this invention. Thus, for example, the nozzle may be designed so as to be retracted completely out of the filter case during the filtering step and a valve may be closed to shut off the washing apparatus from the filter case. Alternatively, the nozzle may be surrounded by a protective cover or sheath which is automatically withdrawn as the washing step is commenced. Many specific ways of accomplishing the objective of protecting the nozzle from contact with the liquid being filtered would be apparent to the skilled artisan. Thus, for example, where the nozzle is constructed with recessed passageways to direct the fluid jets then it can simply be retracted into the sleeve bearing in the end flange to isolate it from the liquid in the filter casing during the filtering operation. Where the nozzle is constructed with spray tips to direct the fluid jets, as in the drawings herein, then a closure disc can be mounted on the nozzle body forward of the spray tips, in such position as to not interefer with the jets of washing fluid, and such disc could seat against a seal ring welded to the end flange when the nozzle is returned to its starting position.

It will be understood that variations in details of construction and modifications in form in addition to those recited above may be made within the spirit and scope of the present invention and it is accordingly intended to include within the scope of the appended claims all such variations and modifications.

What is claimed is:

1. In a filter having a casing provided with an inlet for introducing the liquid to be filtered; a plurality of juxtaposed filter leaves, each of which has a centrally disposed opening therein, mounted within said casing; and filtrate collecting means connected to the periphery of said filter leaves to receive the filtrate and forming a conduit for discharge of the filtrate from the casing; the combination therewith of apparatus for washing the filter leaves comprising (1) a nozzle for directing washing fluid against the faces of said filter leaves, (2) means for supplying washing fluid to said nozzle, and (3) means for simultaneously rotating said nozzle about its axis and advancing said nozzle longitudinally of said casing through the passageway formed by the centrally disposed openings in said filter leaves, said nozzle being adapted to direct at least one stream of washing fluid along a path having a directional component in the direction of travel of said nozzle and at least one other stream of washing fluid along a path having a directional component in the direction opposite to the direction of travel of said nozzle in such manner that said fluid streams contact substantially the full area of the opposing surfaces of adjacent filter leaves as said nozzle traverses the space therebetween and free said surfaces of material adhering thereto.

2. Apparatus as described in claim 1 wherein said nozzle is axially disposed with reference to said filter leaves.

3. Apparatus as described in claim 2 wherein said nozzle provides two fluid directing passages positioned at about 180 degrees to each other each of which is so located as to direct a stream of fluid at an angle, measured from the path of longitudinal travel of the nozzle, the tangent of which is approximately equal to the ratio of filter leaf radius to distance between adjacent filter leaves.

4. Apparatus as described in claim 1 wherein the means for simultaneously rotating the nozzle about its axis and advancing the nozzle longitudinally of the filter casing comprises a fixed feed screw axially aligned with said filter casing and positioned adjacnt one end thereof, a rotatably driven worm gear located adjacent the end of said fixed feed screw opposite said filter casing, a torque tube enclosing said fixed feed screw and fixedly connected to said worm gear, a distribution tube fixedly connected to said nozzle which is coaxial with said torque tube and enclosed thereby and which encloses said fixed feed screw, and means for engaging said torque tube and said distribution tube whereby said distribution tube is advanced along said fixed feed screw as said worm gear is rotated.

5. Apparatus as described in claim 4 wherein the means for engaging said torque tube and said distribution tube is a torque nut driven by contact with said torque tube and fixedly secured to said distribution tube.

6. Apparatus as described in claim 4 including a housing tube enclosing said torque tube and communicating with a source of washing fluid and wherein said torque tube and said distribution tube each contain at least one opening in the wall thereof, whereby washing fluid supplied to said housing tube fills the annular spaces surrounding said torque tube and said distribution tube and the annular space surrounding said fixed feed screw and is discharged through said nozzle.

References Cited
UNITED STATES PATENTS

| | | | |
|---|---|---|---|
| 2,856,236 | 10/1958 | Hunziker | 210—346 X |
| 2,868,379 | 1/1959 | Hunziker | 210—391 X |
| 2,878,942 | 3/1959 | Whitmore | 210—236 X |
| 2,936,075 | 5/1960 | Davis | 210—236 |
| 3,285,417 | 11/1966 | Schmidt et al. | 210—409 X |
| 3,310,171 | 3/1967 | Schmidt et al. | 210—332 X |
| 3,344,922 | 10/1967 | Kracklauer | 210—332 X |

REUBEN FRIEDMAN, *Primary Examiner.*

F. A. SPEAR, Jr., *Assistant Examiner.*

U.S. Cl. X.R.

210—346